(12) United States Patent
Gross

(10) Patent No.: US 6,973,152 B2
(45) Date of Patent: Dec. 6, 2005

(54) EXPLOITING SHORTEST PATH FOR IMPROVED NETWORK CLOCK DISTRIBUTION

(75) Inventor: Kevin Paul Gross, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 297 days.

(21) Appl. No.: 10/310,554

(22) Filed: Dec. 4, 2002

(65) Prior Publication Data

US 2004/0109416 A1 Jun. 10, 2004

(51) Int. Cl.[7] .............................................. H03D 3/24
(52) U.S. Cl. ..................... 375/375; 375/374; 375/376; 370/518
(58) Field of Search ................ 375/371, 375, 375/376; 370/516, 517, 518, 519

(56) References Cited

U.S. PATENT DOCUMENTS

| | | | |
|---|---|---|---|
| 4,228,713 A * | 10/1980 | Gross ........................... | 84/678 |
| 4,873,517 A | 10/1989 | Baratz et al. | |
| 4,987,536 A | 1/1991 | Humblet | |
| 5,561,790 A | 10/1996 | Fusaro | |
| 5,796,787 A * | 8/1998 | Chen et al. .................. | 375/326 |
| 6,098,107 A | 8/2000 | Narvaez et al. | |
| 6,321,271 B1 | 11/2001 | Kodialam et al. | |
| 6,389,090 B2 * | 5/2002 | Zortea et al. ............... | 375/374 |
| 2001/0032272 A1 | 10/2001 | Fujita | |
| 2002/0059025 A1 | 5/2002 | Kim et al. | |
| 2003/0161268 A1 * | 8/2003 | Larsson et al. ............. | 370/229 |
| 2003/0164794 A1 * | 9/2003 | Haynes et al. .............. | 342/353 |
| 2003/0215039 A1 * | 11/2003 | Block et al. ................. | 375/376 |
| 2004/0062278 A1 * | 4/2004 | Hadzic et al. .............. | 370/503 |

* cited by examiner

Primary Examiner—Jay K. Patel
Assistant Examiner—Qutub Ghulamali
(74) Attorney, Agent, or Firm—Swanson & Bratschun, LLC

(57) ABSTRACT

Apparatus and methods are provided for exploiting the existence of a shortest path between a source device and a destination device by identifying the shortest path and using the signal which has taken the shortest path in preference to delayed transmissions or delayed images of the same signal, thereby improving signal distribution. The present invention provides a processor between a phase-sensitive detector and a low pass filter of a phase locked loop for selecting and driving the PLL primarily from the signal which has taken the shortest path.

10 Claims, 3 Drawing Sheets

EXPLOITING SHORTEST PATH FOR IMPROVED NETWORK CLOCK DISTRIBUTION

TECHNICAL FIELD

The present invention relates generally to the field of signal distribution and, in particular, to improved signal reception in a network or other computing environment in which a signal may take several paths to its destination, each path having an associated delay.

BACKGROUND ART

In many computing or communications environments, a resource is shared among several or many devices. Numerous devices may be interconnected and various signals are transmitted among the devices. A signal from a source device may be directed to a selected target device. However, because of multiple-path delays or congestion, the signal taken by one path will arrive at the target device at a slightly different time relative to the signal taken by another path or experiencing a different congestion scenario (that is, delays due to other signals having a higher priority). In either situation, a delay variation will exist among the signals. As illustrated schematically in FIG. 1, a multiple-path delay refers to the delay which occurs when, due to the architecture of a system, such as a network 100, a signal or packet of information may take multiple paths before reaching the target device, with a delay being introduced by each path. Thus, a packet being transmitted from a first device 102 to a second device 104 may be routed along several paths (simultaneously or in turn), such as a first path 110, 112, 114, 116 and 118 and a second path 110, 120, 118 (where path legs are connected by routers, switches or other devices 130). Congestion refers to a transmission of a packet from a source device to a target device waiting for the transmission of other packets to be completed and removed from the network before transmission of a packet can be entertained. In either situation, a delay variation may exist in which the signal arrives with the target at several different propagation times.

FIG. 2A represents an exemplary clock reference signal which is transmitted by a source device (also known as a "conductor"). Ideally, the reference signal should be precisely reproduced at precisely the same time at the target or destination device (also known as a "performer"), as illustrated in FIG. 2B. However, due to the factors noted above, and others, a delay will occur in the actual signal, as is apparent in FIG. 2C. And, when the signal takes various paths from the source to the destination, it may be received at the target device at various time as illustrated in FIG. 2D.

One network architecture which has been developed by the Peak Audio division of Cirrus Logic, Inc. is an audio network marketed under the name CobraNet™. CobraNet technology allows uncompressed, real-time, single- or multiple-channel digital audio, clocking and control data to be transmitted over an Ethernet network. Audio sources, signal processing, amplification and sound projection may be distributed throughout a facility, all interconnected by Ethernet CAT-5 or optical cabling. Thus, any (single or multiple) audio input may be routed to any (single or multiple) audio output with each input and each output being capable of being processed and amplified individually. It will be appreciated that accurate clocking of signals being transmitted over a CobraNet-enabled network (or other like environment) is important in order to reduce disturbances caused by jitter which may degrade the performance of digital-to-analog converters (DACs) and analog-to-digital converters (ADCs) and produce stereo imaging problems.

One existing method for detecting and processing a signal in a destination device is to use a phase locked loop (PLL). FIG. 3 is a block diagram of an exemplary PLL 300. A signal is received at a first input of a phase-sensitive detector 302 which compares the phase of the reference signal at the first input with the phase of a signal received at a second input. The detector 302 outputs a voltage signal which is proportional to the phase difference and transmitted to a low pass filter 304. The filtered signal is then transmitted to a local clock or voltage-controlled oscillator (VCO) 306. The VCO 306 output is fed back to the second input of the detector 302. Thus, the output of the VCO 302 is a sine wave locked to the predominant frequency of the signal input to the detector 302. As is known, the low pass filter 304 provides an averaging function such that the frequency of the signal output by the VCO 306 represents an average of the delays of the multiple signals received from the source. Because both the delays and the variations are not constant, it will be appreciated that the "average" will also vary. While a noisy environment such as this may be modeled by a normally distributed noise signal (see FIG. 4A), the probability curve of an actual communication system is asymmetrical and bounded at some minimum quantity due to physical propagation limitations and fixed processing overhead, as shown in FIG. 4B. And, although such a probability curve may be satisfactory for small, local networks in which the network architecture is controllable, it is not satisfactory in larger network environments, including wide area and wireless networks which have a wider range of delay variation as shown in FIG. 4C.

SUMMARY OF THE INVENTION

The present invention provides apparatus and methods for exploiting the existence of a shortest path between a source device and a destination device by identifying the shortest path and using the signal which has taken the shortest path in preference to delayed transmissions or delayed images of the same signal, thereby improving signal to noise ration seen by a PLL. The present invention provides a processor between a phase-sensitive detector and a low pass filter of a phase locked loop. In one embodiment, the processor includes a scaler, such as an exponential scaler, providing asymmetrical error weighting to enhance the contribution of signals with a smaller delay (shorter path).

In a second embodiment, the processor further includes a self-adjusting threshold to prevent the PLL from free running in the "masked" state for an extended period of time. When the PLL is operating normally, the threshold level is gradually increased, thus decreasing the width of the mask, until many errors are ignored and only a fixed percentage of the lowest delay signals from the detector are passed to the low pass filter to enable the PLL to regain lock.

In further embodiments, methods for processing a signal are provided to exploit the presence of a shortest path.

DETAILED DESCRIPTION OF THE PREFERRED EMBODIMENT

Figure 1:
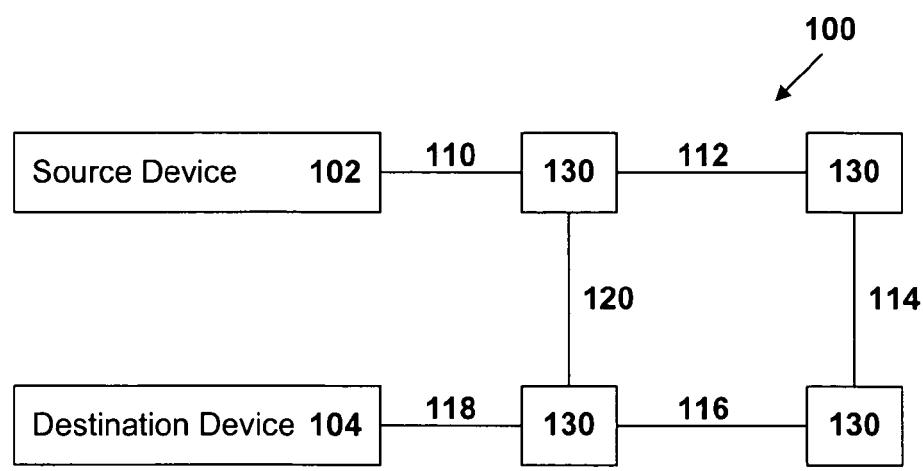
FIG. 1 is a block diagram of an exemplary network in which the present invention may be incorporated.
Figure 2A:
FIG. 2A illustrates a master clock signal transmitted from a source device.
Figure 2B:
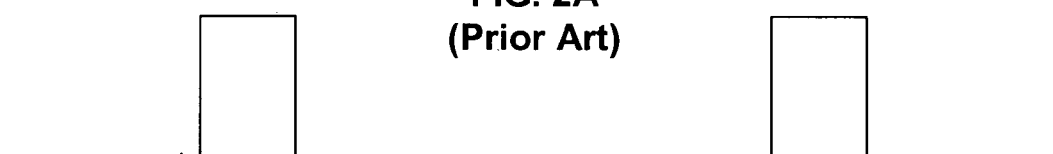
FIG. 2B illustrates a clock signal as ideally received by a destination device.
Figure 2C:
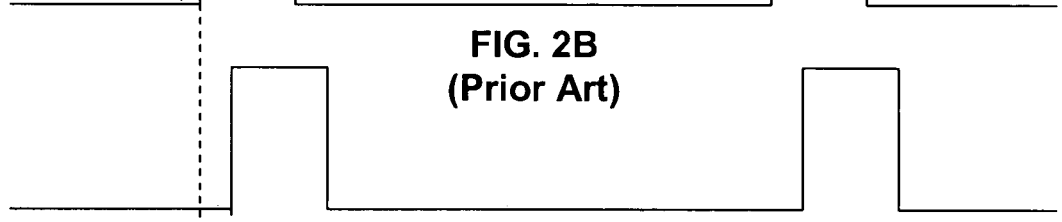
FIG. 2C illustrates a clock signal as received by a destination device.
Figure 2D:
FIG. 2D illustrates a clock signal transmitted on multiple paths as received by a destination device.
Figure 3:
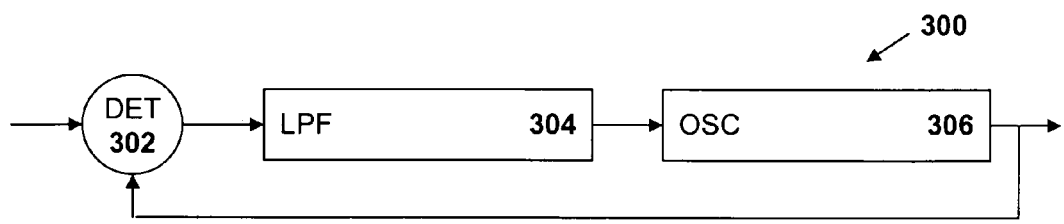
FIG. 3 is a block diagram of a prior art phase locked loop used by a destination device to detect and process signals transmitted by a source device.
Figure 4A:
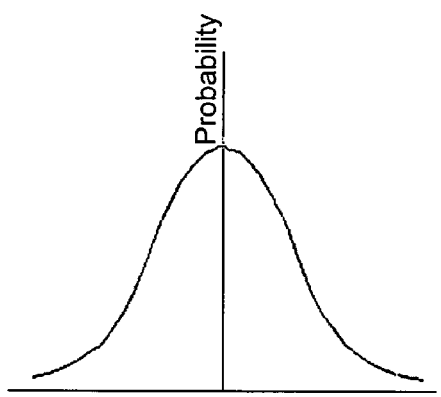
FIG. 4A is a probability curve illustrating a normally distributed noise signal.
Figure 4B:
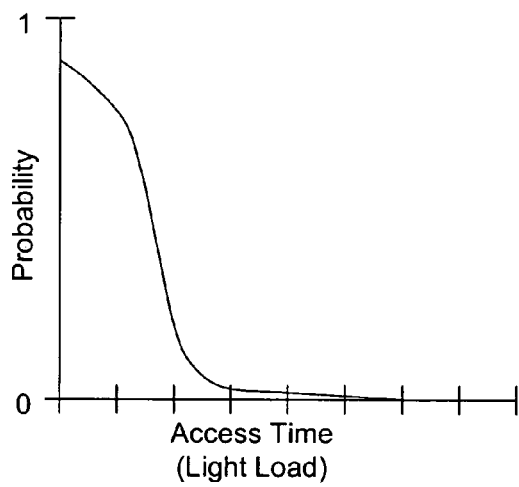
FIG. 4B is a probability curve illustrating the effects of delay variations in the reception by a destination device of a signal from a source device in a small network or one having little congestion.
Figure 4C:
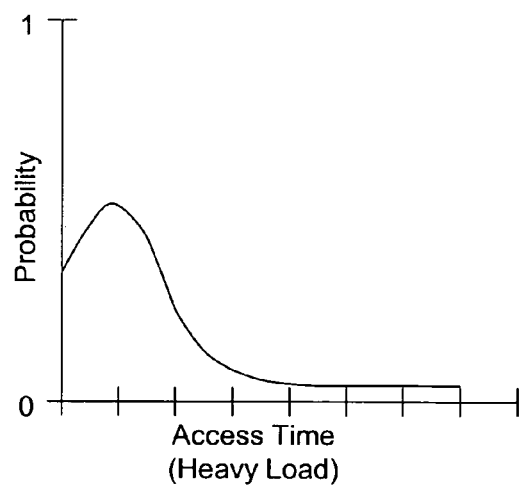
FIG. 4C is a probability curve illustrating the effects of delay variations in the reception by a destination device of a signal from a source device in a large network or one having much congestion.
Figure 5:
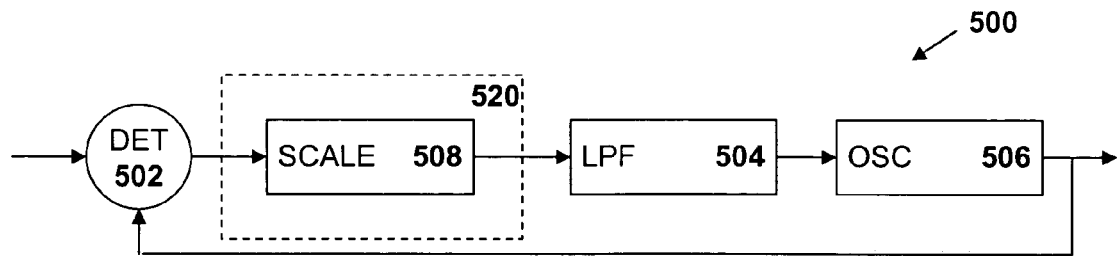
FIG. 5 is a block diagram of a first embodiment of the apparatus of the present invention.

FIG. 5 is a block diagram of one embodiment of circuitry 500 of the present invention. The detector 500 includes a dual-input phase-sensitive detector 502, a low pass filter 504, and a voltage-controlled oscillator 506, elements common to the PLL of FIG. 3. Additionally, the device 500 includes a processor 520, such as an exponential scaler 508, coupled between the detector 502 and the low pass filter 504. The scaler 508 exaggerates the effects of small errors (which represent small delays and are close to the ideal in FIG. 4B) and reduces the effects of larger errors (which represent larger errors and are farther from the ideal). Thus, while the device generates an average, the average generated is closer to the ideal.

Figure 6:
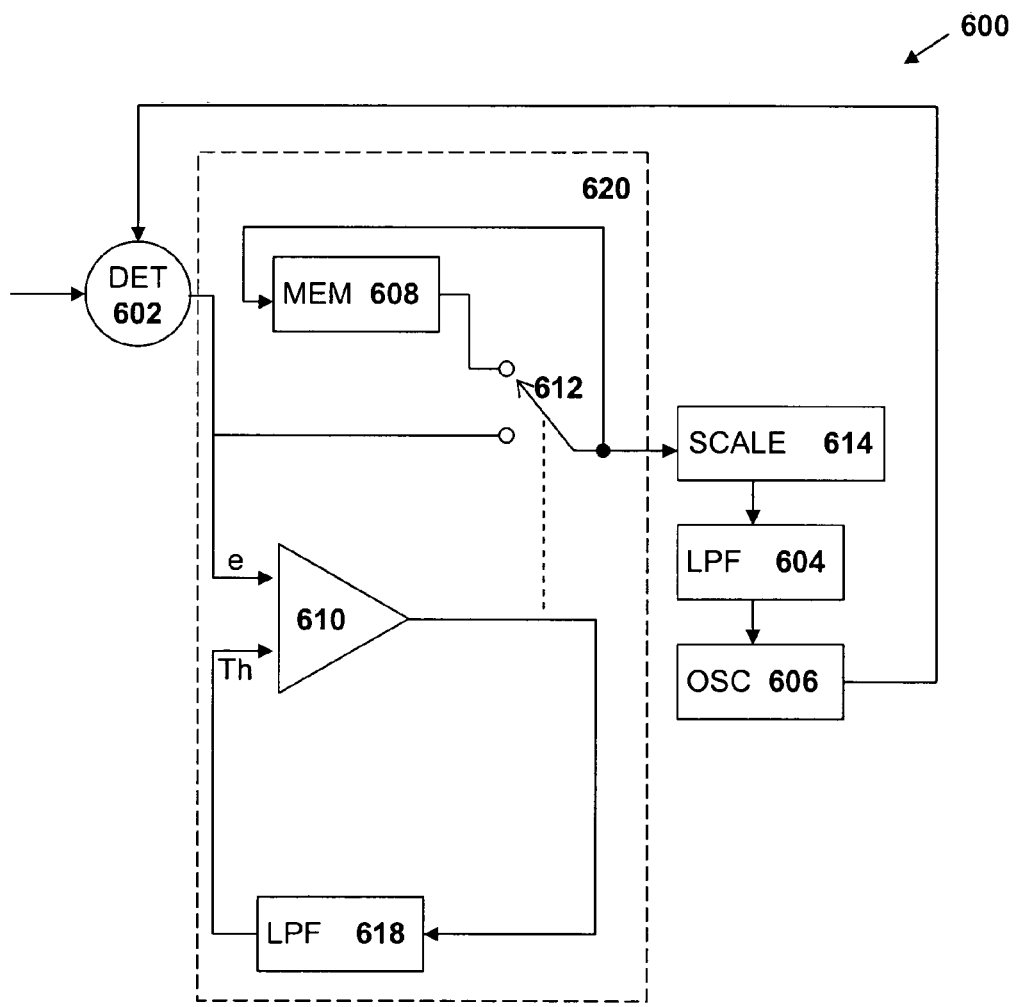
FIG. 6 is a block diagram of a second embodiment of the apparatus of the present invention.

FIG. 6 is a block diagram of a second embodiment of the device 600 of the present invention. The device 600, includes a dual-input phase-sensitive detector 602, a low pass filter 604, and a voltage-controlled oscillator 606 and a processor 620 comprising a memory element 608, a comparator 610 and a switching element 612. Additionally, the processor 620 includes a second low pass filter 618. The input to the second low pass filter 618 is coupled to receive the output of the comparator 610 and the output of the second low pass filter 618 is coupled to the second input of the comparator 610. Thus, the second low pass filter 618 will generate a threshold Th which varies as the output of the comparator 610 changes. If the error signal e is greater than the threshold Th, the actual input (output from the detector 602) is ignored and the previous input level (stored in the memory element 608) is input to the first low pass filter 604. The second low pass filter 618 gradually increases the level of the threshold Th such that eventually, the actual input will be lower than the threshold Th and the comparator 610 will cause the switching element 612 to move to the normal position whereupon a lock may be retained. An optional exponential scaler 614 may be coupled between the switched terminal of the switching element 612 and the input to the low pass filter 604 or between the output of the detector 602 and the first switched terminal to further enhance the operation of the device 600.

The objects of the invention have been fully realized through the embodiments disclosed herein. Those skilled in the art will appreciate that the various aspects of the invention may be achieved through different embodiments without departing from the essential function of the invention.

Moreover, the present invention may be incorporated in environments other than the network described herein. For example, the present invention may be incorporated in microprocessing environments involving timestamps, software clocking and IRQs, and in general communications systems to improve the accuracy of synchronous-isochronous-synchronous conversions, and in wireless transmission systems to mitigate multipath and reflection issues. The particular embodiments are illustrative and not meant to limit the scope of the invention as set forth in the following claims.

What is claimed is:

1. Circuitry for exploiting a shortest path in a system in which a signal may take a plurality of simultaneous paths between a source device and a destination device, comprising:

a detector comprising:
   a data input for receiving signals from the source device;
   a control input; and
   an output;

a processor comprising:
   memory means;
   switch means comprising:
      a controllable switching terminal coupled to an input of the memory means;
      a first switched terminal coupled to the output of the detector; and
      a second switched terminal coupled to an output of the memory means; and
   comparator means for comparing the level of the output of the detector with a threshold level, the comparator means comprising:
      a first input coupled to the output of the detector;
      a second input coupled to receive a threshold level; and
      an output coupled to control the switching terminal of the switch means;

a low pass filter comprising an input coupled to the switching terminal of the switch means of the processor; and an oscillator comprising:
   an input coupled to receive an output of the low pass filter; and
   a signal output coupled to the control input of the detector;

whereby:
   when the output of the detector has a level which is less than the threshold level, the output of the detector is coupled through the switch means to the input of the low pass filter; and
   when the output of the detector has a level which is greater than the threshold level, the output of the memory means is coupled through the switch means to the input of the low pass filter.

2. The circuitry of claim 1, wherein the processor further comprises a scaler coupled between switching terminal of the switch means and the input of the low pass filter.

3. The circuitry of claim 1, wherein the processor further comprises a scaler coupled between the output of the detector and the first switched terminal.

4. The circuitry of claim 1, wherein the processor further comprises a second low pass filter comprising:
   an input coupled to the output of the comparator means; and
   an output coupled to transmit the threshold to the second input of the comparator means.

5. A network for transmitting signals among devices, comprising:
   a source device;
   at least one destination device interconnected with the source device through a plurality of signal paths, each destination device comprising:
      a detector comprising:
         a data input for receiving signals from the source device;
         a control input; and
         an output;
      a processor comprising:
         memory means;
         switch means comprising:
            a controllable switching terminal coupled to an input of the memory means;
            a first switched terminal coupled to the output of the detector; and
            a second switched terminal coupled to an output of the memory means; and
         comparator means for comparing the level of the output of the detector with a threshold level, the comparator means comprising:
            a first input coupled to the output of the detector;
            a second input coupled to receive a threshold level; and
            an output coupled to control the switching terminal of the switch means;
         a low pass filter having an input coupled to the switching terminal of the switch means of the processor; and
         an oscillator comprising:
            an input coupled to receive an output of the low pass filter; and
            a signal output coupled to the control input of the detector;
         whereby:
            when the output of the detector has a level which is less than the threshold level, the output of the detector is coupled through the switch means to the input of the low pass filter; and
            when the output of the detector has a level which is greater than the threshold level, the output of the memory means is coupled through the switch means to the input of the low pass filter.

6. The network of claim 5, wherein the processor further comprises a scaler coupled between switching terminal of the switch means and the input of the low pass filter.

7. The network of claim 5, wherein the processor further comprises a second low pass filter comprising:
   an input coupled to the output of the comparator means; and
   an output coupled to transmit the threshold to the second input of the comparator means.

8. A destination device for interconnecting to a network, the network including a source device, the destination device comprising:
   a detector comprising:
      a data input for receiving signals from the source device;
      a control input; and
      an output;
   a processor comprising:
      memory means;
      switch means comprising:
         a controllable switching terminal coupled to an input of the memory means;
         a first switched terminal coupled to the output of the detector; and
         a second switched terminal coupled to an output of the memory means; and
      comparator means for comparing the level of the output of the detector with a threshold level, the comparator means comprising:
         a first input coupled to the output of the detector;
         a second input coupled to receive a threshold level; and
         an output coupled to control the switching terminal of the switch means;
   a low pass filter comprising an input coupled to the switching terminal of the switch means of the processor; and
   an oscillator comprising:
      an input coupled to receive an output of the low pass filter; and
      a signal output coupled to the control input of the detector;
   whereby:
      when the output of the detector has a level which is less than the threshold level, the output of the detector is coupled through the switch means to the input of the low pass filter; and
      when the output of the detector has a level which is greater than the threshold level, the output of the memory means is coupled through the switch means to the input of the low pass filter.

9. The circuitry of claim 8, wherein the processor further comprises a scaler coupled between switching terminal of the switch means and the input of the low pass filter.

10. The circuitry of claim 8, wherein the processor further comprises a second low pass filter comprising:
   an input coupled to the output of the comparator means; and
   an output coupled to transmit the threshold to the second input of the comparator means.

* * * * *